Sept. 7, 1948.　　　A. W. SCHMID　　　2,448,915
APPARATUS FOR FEEDING GLASS
Filed Jan. 15, 1944
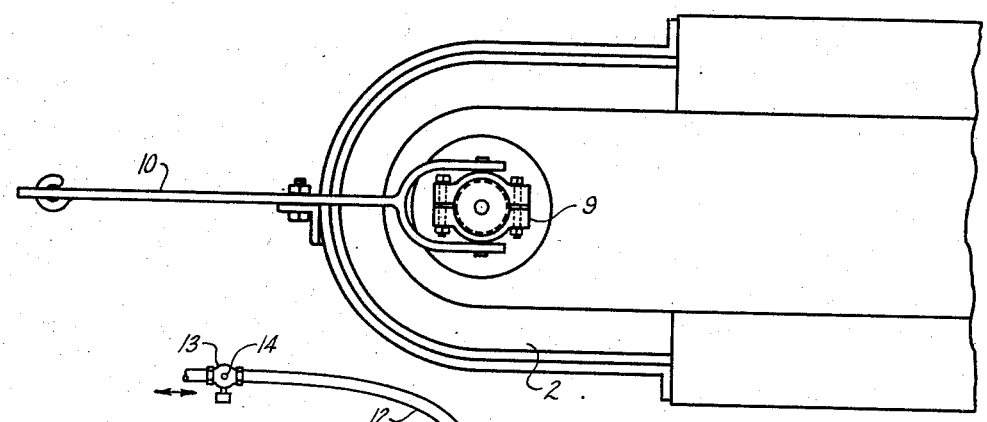
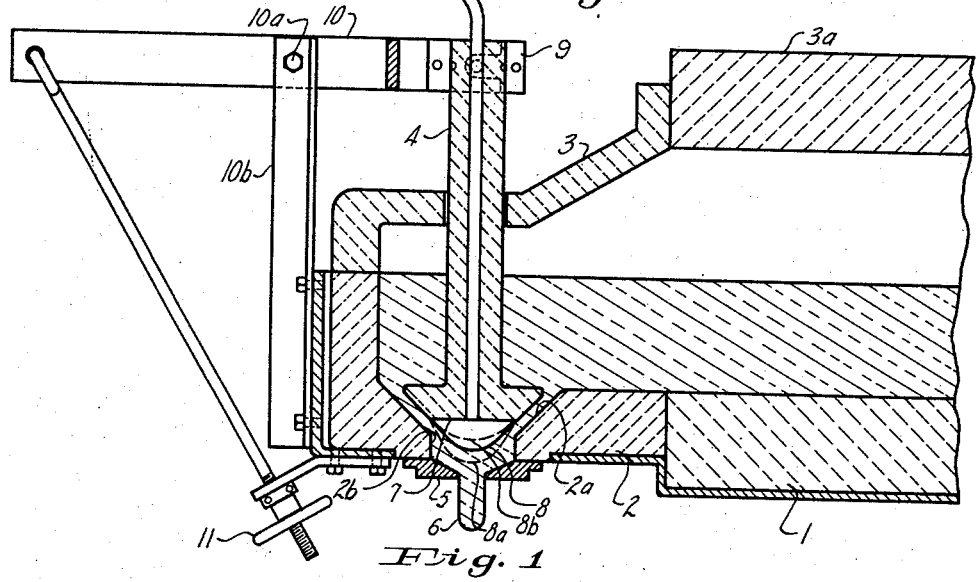
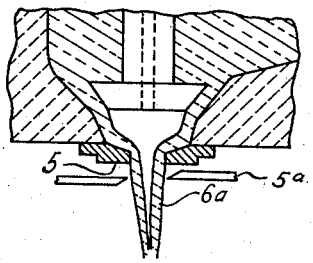
INVENTOR.
Arthur W. Schmid
BY William B. Jaspert
Attorney.

Patented Sept. 7, 1948

2,448,915

UNITED STATES PATENT OFFICE 2,448,915

APPARATUS FOR FEEDING GLASS

Arthur W. Schmid, Brookside Farm, Pa.

Application January 15, 1944, Serial No. 518,335

2 Claims. (Cl. 49—55)

This invention relates to new and useful improvements in apparatus for feeding molten glass, and it is among the objects thereof to provide means of feeding mold charges or gobs of molten glass to the molds of ware forming machines which shall maintain uniformity in the weight and shape of such gobs.

It is still a further object of the invention to provide means for employing pneumatic feeders of the pulsator type to feed gobs at greater speeds than heretofore accomplished.

In the conventional method of feeding gobs or suspended mold charges, positive and negative pressure impulses on the glass are employed to regulate the shape and weight, assuming other factors such as the viscosity and temperature of the glass remain constant.

In pneumatic feeders heretofore employed the maintenance of uniform gob sizes and shapes has been difficult because the negative or suction impulse had a tendency to accumulate more or less glass in the region of the submerged feed orifice, which resulted in variances in the extruded mass upon the application of the pressure stroke.

In accordance with the present invention, these difficulties are eliminated by feeding the glass to the submerged feeding orifice in a manner to maintain a minimum mass of glass above the orifice to render the positive and negative impulses effective on the glass within the feeding orifice, thereby requiring less positive and negative pressures in the proper feeding of the glass.

This is accomplished by means of the present invention through the utilization of an air pocket or bubble between the body of the glass above the submerged feeding orifice and the pulsator refractory.

The present invention further contemplates greater uniformity in the quality of the glass by providing a relatively large area from which the glass is delivered to the feed orifice and in which the feeding stream is located at the bottom of the feeder forehearth.

The invention will become more apparent from a consideration of the accompanying drawing constituting a part hereof in which like reference characters designate like parts and in which:

Fig. 1 is a vertical cross-sectional view of a pneumatic feeder and a portion of a forehearth embodying the principles of this invention;

Fig. 2 a top plan view thereof with the refractory cover removed; and

Fig. 3 a vertical section of a portion of the feeder around the glass flow passage and the submerged orifice ring.

With reference to Fig. 1 of the drawing, the structure therein illustrated comprises a portion of a forehearth 1 to which is attached the feeder spout or boot 2 which is enclosed by a cover 3 abutting against the roof of the forehearth 3a.

The flow spout is of inverted truncated cone shape, having rather wide flaring walls 2a converging in a cylindrical wall 2b which constitutes the feed chamber. Extending through an opening in the feeder cover 3 is a refractory valve 4. An orifice ring 5 is secured below the feed chamber 2b having an opening which primarily determines the diameter or size of the mold charge or gob designated by the numeral 6.

The bottom end of the refractory valve 4 is provided with a truncated conical head, the flat face 7 of which constitutes the upper wall of the feed chamber. The numeral 8 designates the gravity flow level of the glass; 8a the lowermost level of the glass at the end of the extrusion stroke, and 8b the upper level of the glass at the end of the suction or retraction stroke.

The refractory valve 4 is mounted in a bracket 9 which is secured to a beam 10 pivoted at 10a to an upright 10b secured to the nose of the feeder spout. The beam 10 is movable by hand wheel 11 to adjust the refractory sleeve vertically relative to the feed chamber.

Bracket 9 is provided with trunnions pivoted in the yoke of the beam 10 to maintain vertical position of the sleeve 4 when the beam is subjected to angular adjustment by rotation of the hand wheel 11.

The opening of the sleeve 4 is connected by conduit 12 to a source of positive and negative air pressures controlled by a valve 13 having a bleeder 14 to adjust the intensity of the impulses.

The operation of the above-described feeding apparatus is briefly as follows:

With the molten glass in the forehearth at a level substantially above the hearth and with the glass at proper working temperature, which can be regulated by burners in a conventional manner, the lowermost stratum of the glass on the forehearth will be of the highest viscosity and of best quality.

By adjusting the refractory valve 4 to maintain a minimum flow passage between the conical wall of the flow spout and the complementary shaped wall of the refractory valve 4, a sufficient volume of glass accumulates above the orifice ring 5 to render the impulses of the positive and negative air pressures in the valve 4 effective on the glass in the feed chamber and in the orifice ring.

As shown in Fig. 3, when valve 4 is unseated the initial gravity flow of the glass without the application of the pressure impulse would result in a flow stream 6a that is hollow in the region of the orifice ring 5. When solid gobs are required the refractory valve is adjusted to increase the flow as shown in Fig. 3 to the point where the negative and positive impulses are effective to initially lift the glass to the level shown at 8b and on the expulsion stroke force the glass level to the position shown at 8a.

Because of the minimum quantity of glass acted upon by the positive and negative impulses, very little negative pressure is required to retract the glass, which is done for the purpose of necking the glass at the point of severance, immediately below the orifice ring 5 to retract the stub for reheating within the orifice ring after severance by the shears 5a. In effect an air bubble is maintained between the top surface of the glass in the feed chamber and the end 7 of the refractory tube, which prevents clogging and inefficient operation of the feeder. The glass does not come in contact with the lower flat end of the refractory valve 4 and cannot be drawn into the hollow interior of the impulse sleeve.

The design of the flow spout and coacting refractory sleeve is such as to produce the reverse effect of the conventional hollow bell-shaped type pneumatic feeder in which the glass is drawn into the bell and subjected to positive and negative pressure impulses.

By making the refractory valve blunt on the end and not cupped out or hollowed, the air chamber is maintained outside of the sleeve in the feed chamber to reduce the volume of the glass above the feed orifice and by this means uniformity of the shape and weight of the gob is maintained and the rate of feeding is substantially increased as there is no lagging of a large glass mass and the feeding impulses are directly effective on the glass in the feed orifice and mold charge.

Although one embodiment of the invention has been herein illustrated and described, it will be evident to those skilled in the art that various modifications may be made in the details of construction without departing from the principles herein set forth.

I claim:

1. Apparatus for feeding suspended mold charges comprising a forehearth, a feeder boot therefor having a funnel-shaped aperture terminating in a cylindrical wall of an impulse chamber and having an orifice ring at the bottom thereof, a hollow adjustable valve complementary in shape to the wall of the funnel-shaped aperture having a blunt end of substantially the diameter of the cylindrical wall of the funnel-shaped aperture and forming a wall of said impulse chamber, means communicating with the hollow interior of said valve for transmitting positive and negative air pressures to said impulse chamber above the orifice ring in such proportion as to maintain an air bubble above the glass in the impulse chamber, and means for adjusting the valve to regulate the flow of glass to said chamber.

2. Apparatus for feeding suspended mold charges comprising a forehearth, a feeder boot therefor having a funnel-shaped aperture terminating in an impulse chamber below said aperture having an orifice ring at the bottom thereof, a hollow adjustable valve complementary in shape to the wall of the funnel-shaped aperture having a blunt end of substantially the area of the impulse chamber below the funnel-shaped aperture and forming a wall of said impulse chamber, means communicating with the hollow interior of said valve for transmitting positive and negative air pressures to said impulse chamber above the orifice ring in such proportion as to maintain an air bubble above the glass in the impulse chamber, and means for adjusting the valve to regulate the flow of glass through the passage between the funnel-shaped aperture and the complementary shaped wall of the valve to said impulse chamber.

ARTHUR W. SCHMID.

REFERENCES CITED

The following references are of record in the file of this patent:

UNITED STATES PATENTS

| Number | Name | Date |
| --- | --- | --- |
| 1,574,709 | Soubier | Feb. 23, 1926 |
| 1,796,929 | Howard | Mar. 17, 1931 |
| 1,847,276 | Stenhouse | Mar. 1, 1932 |
| 1,995,276 | Howard | Mar. 19, 1935 |
| 2,048,983 | Wadsworth | July 28, 1936 |
| 2,055,676 | Stewart | Sept. 29, 1936 |
| 2,131,242 | Wadsworth | Sept. 27, 1938 |

FOREIGN PATENTS

| Number | Country | Date |
| --- | --- | --- |
| 10,560 | Great Britain | May 4, 1909 |